Jan. 31, 1961
G. W. WALTON
PUMP VALVE
2,969,951
Filed May 31, 1957
2 Sheets-Sheet 2
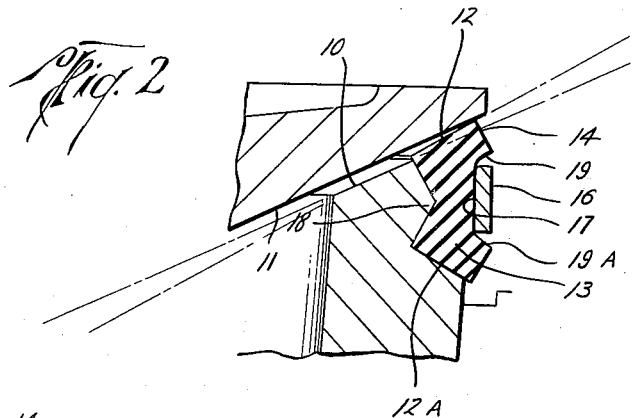
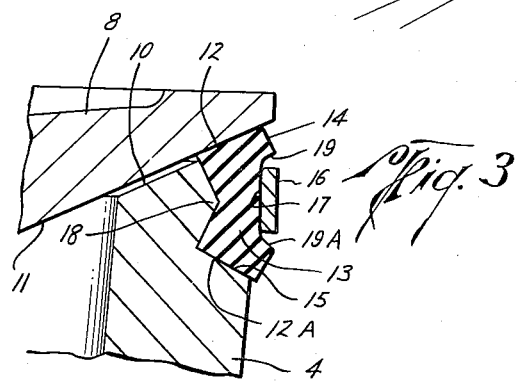
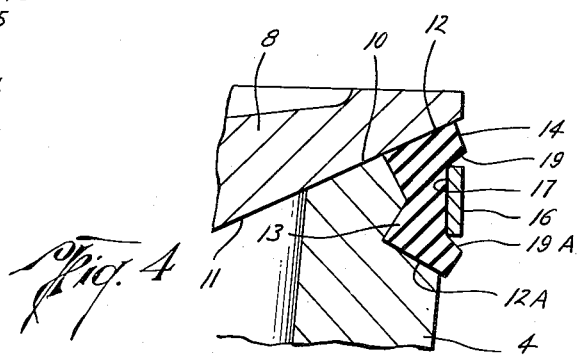
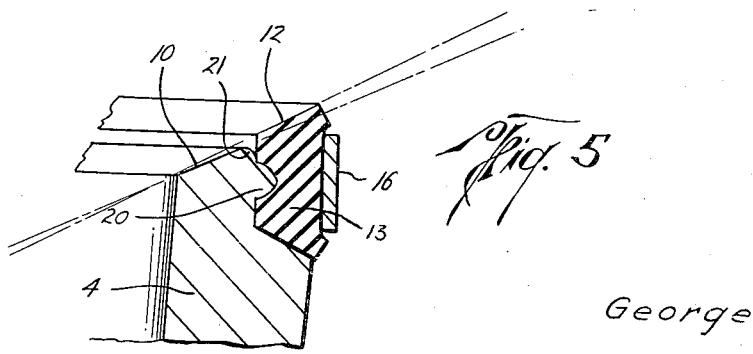
George W. Walton
INVENTOR.
BY Browning, Simms & Hyer
ATTORNEYS

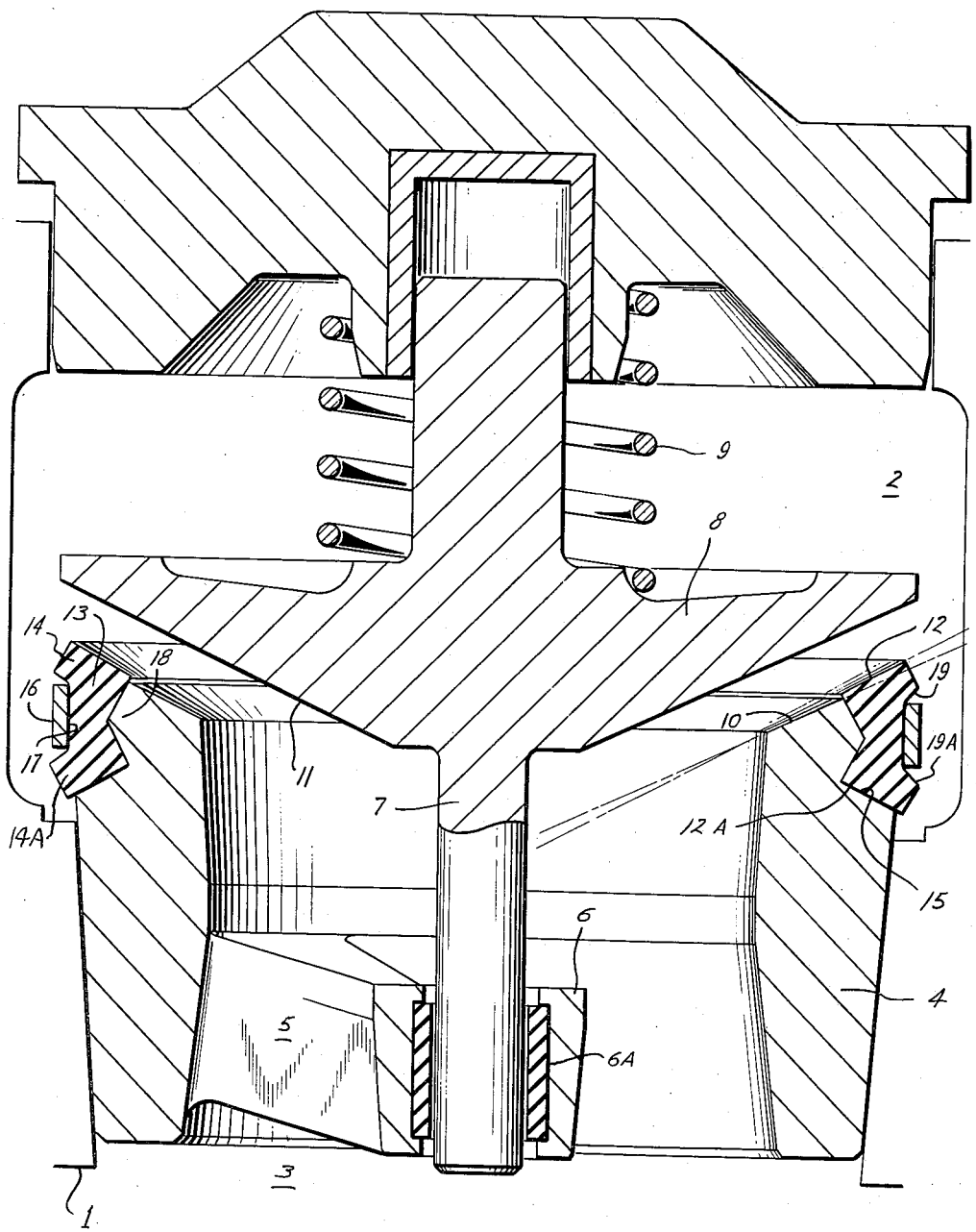

United States Patent Office

2,969,951
Patented Jan. 31, 1961

2,969,951

PUMP VALVE

George W. Walton, Dallas, Tex., assignor, by mesne assignments, to Dresser Industries, Inc., Dallas County, Tex., a corporation of Delaware Filed May 31, 1957, Ser. No. 662,757

4 Claims. (Cl. 251—332)

The present invention relates to improvements in valve seating arrangements particularly useful in valves for piston type pumps such as slush pumps, cementing pumps, acidizing pumps, water pumps, etc.

The prior art has considered the valve problems of pumps in great detail. As wells have gone deeper, pressures required have gone up. The mud pump frequently is sand laden, and the abrasive effect of sand under the extremely high pressures and fluid velocities causes wear of their metal and rubber parts. Leakage of valves is a constant threat to the life of pump parts under these conditions.

The mechanical impact, or pounding, of the valves upon their metallic seats is still another problem. The deterioration of the valves under these conditions of abrasiveness and mechanical pounding frequently has been rapid and expensive. Even the noise level has presented a problem in the confined quarters of off-shore drilling.

The present invention provides a valve seat for piston type pumps which gives a "fluid cushion" for the valve. A resilient packing, or seal, ring is caused to form a portion of the seat so as to absorb the shock of the valve as it meets the seat, and seal the high pump pressure effectively, while capable of being easily replaced without the need for pulling the metallic seat from the deck of the valve pot. An additional feature the invention provides is the reversal of the resilient packing, or seal, ring when worn on one of its seating surfaces. A second, alternate, seating surface is provided which is available when the ring is reversed on its support in the valve.

The present invention provides a new shape and support for a resilient packing, or seal, ring which will reduce flexure, or tension, of the ring material to a minimum when contacted by the valve element. The packing is captured with a rigid, continuous, metallic locking ring, on the metallic seat, so that the differential fluid pressure developed across it will be utilized, through itself, to provide a fluid cushion to the descending valve area. Functioning in this manner, the packing is maintained in a maximum of compression and given a minimum of flexure.

A primary object of the invention is to valve the high pressure fluids of pumps with a minimum of wear on the pump parts.

Another object is to reduce the force of direct impact between the metallic surfaces of a pump valve and seat.

Another object of the invention is to provide an arrangement of resilient packing material for the valve which will provide a maximum of compressive force on the packing and a minimum of flexure force when functioning as a valve seat.

Another object is to provide a packing ring valve seat which is formed to provide alternate surfaces for valving when reversed with respect to a valve element.

Other objects, advantages and features of the invention will be apparent to those skilled in the art upon consideration of the disclosure, claims and drawings.

In the drawings:

Fig. 1 is a sectioned side elevation of a valve and seat in which the invention is embodied.

Fig. 2 is a portion of the structure of Fig. 1 showing the valve as it initially contacts the packing, or seal, ring of the seating surface.

Fig. 3 is a portion of Fig. 1 showing the valve fully engaging the resilient packing, or seal, ring of the valve seat.

Fig. 4 is a portion of Fig. 1 illustrating the valve element and seat fully engaged.

Fig. 5 is a side elevation of another embodiment of the invention illustrated by the other figures.

Figs. 1–4 show the structural embodiment of the invention in various functional relationships in order to illustrate the cooperation of the various parts. Specifically, the illustrations show the valve element fully disengaged from the seat and progressively engaging portions of the seat in carrying out the objects of the invention.

The complete slush pump is not shown, however, the valve pot is generally illustrated. These structures are deemed sufficiently well-known and do not need specific illustration. The deck 1 within the pot has been indicated. It is understood that the deck divides the pot into pressure chamber 2 and suction chamber 3. As the piston of the slush pump reciprocates, the pressure differential between these chambers varies between its limits. The problems which arise from the valving between these two pressures are met by the present invention.

Metallic valve seat ring 4 is pressed into a hole of deck 1. Arm 5 supports a guide bushing 6 and resilient bushing liner 6A for stem 7 of valve element 8. Spring 9 can be used to urge the valve closed, although gravity could be relied upon for this purpose.

Valve element 8 is disc-shaped and tapers from its outer periphery downwardly. Seat ring 4 provides an upper abutting surface to engage the downwardly-tapering surface of valve 8. Specifically, seat surface 10 and valve surface 11 have corresponding angles with respect to a horizontal plane.

The angles of inclination of valve surface 11 and seat surface 10 are made as small as practical in order to reduce the valve lift necessary to pass the required amounts of fluids at reasonable velocities. If this angle is small, the velocity of travel of the valve is small and the resulting impact load of the valve on its seat is correspondingly reduced. This arrangement alone minimizes the mechanical pounding between valve and mechanical seat. In combination with the other features of the invention, the pounding is greatly reduced with a resulting "fluid cushioning."

It may now be appreciated that the complete seating surface provided for valve surface 11 is comprised of both surface 10 and surface 12, although surface 12 alone can be relied upon as the one forming the fluid seal, surface 11 then being a supporting or abutting surface for the valve element when closed. Surface 12 is provided by ring 13, a packing, or seal, of resilient material, preferably of a rubber compound. It is the cooperation of the structure providing these two surfaces which attains some of the objects of the invention.

Note is also to be made of the fact that the active seat surface 12 is elevated high enough above the plane of surface 11 to function as a seal and fluid cushioning structure. However, surface 12 is not so high as to place this body of rubber so far into the flow of fluid through the valve as to materially restrict the flow.

Fig. 1 illustrates the valve and seat fully disengaged. In this position, the flow of fluid between opposite sides of the deck is at a maximum. However, movement of the pump piston in one direction will cause fluid to flow from chamber 2 to chamber 3 and, correspondingly, movement of valve 8 downward, toward its seat.

Fig. 2 illustrates the valve and seat being brought together in their initial contact. The pressure in chamber 2 is very high. As soon as lip 14 of ring 13 contacts surface 11, the pressure of chamber 3 falls rapidly to suction value.

Note that lips 14 and 14A are formed of the surfaces 12 and 12A which slope inwardly toward the center of the packing ring and the surfaces which slope outwardly from the center of the ring, toward a horizontal plane through the center of the ring.

The differential pressure across lip 14 becomes very high, immediately after contact with valve element surface 11. Also, the pressure all along the outside surfaces of ring 13, exposed to the pressure of chamber 2, places the ring material under compression. With the fluid pressure of chamber 2 placing ring 13 under compression, surface 12 is urged upward toward descending surface 11 by the forces normal to its plane. The plane of surface 12 has a greater angle from the horizontal than valve surface 11. Therefore, the resistance to the downward movement of valve element 8, with the fluid cushioning force of surface 12, increases as the motion of valve 8 continues downward, generated by the fluid pressure of chamber 2.

Specific note is to be made of the fact that as the outer lip portion of ring surface 12 is depressed by descending valve 8, the slight flexing that does occur to this lip causes the entire surface 12 to cantilever. The result is that the vertical surface of body 13, at the juncture of surfaces 10 and 12, pulls away from the supporting wall of the recess prior to the meeting of surfaces 10 and 11. Then, when this meeting has occurred, the increasing fluid pressure of chamber 2 causes the resilient rubber material of lip 14 to flow into the corner formed by the surfaces 10 and 11 to make a tight seal with them.

A large amount of the force of valve 8 is absorbed by the resilient material of ring 13 before surface 10 of metallic ring 4 is engaged. The result is to greatly reduce the amount of impact force between metallic surface 10 and metallic surface 11 and, at the same time, attaining efficient valving from the moment lip 14 engages surface 11 of valve element 8.

Before analyzing the forces which hold ring 13 in compression, the shape of the ring itself should be more closely examined. In all views, the cross-section of ring 13 is illustrated. With respect to a horizontal plane at its center, the ring is symmetrical in form. With this configuration, the ring is reversible. When surface 12 eventually becomes worn or scored, ring 13 may be reversed and surface 12A substituted for surface 12 for a similar period of use. The reversibility in itself, provides greatly lengthened life over non-reversible prior art rings.

Next, note that ring 13 is held in a recess of the upper part of the seat section of metallic seat ring 4. In this manner, the seating surface 10 is extended, with seating surface 12, or, seating surface 12 may be looked upon as replacing what would otherwise be an extension of the metallic seating surface 10.

In recess 15 of metallic ring 4, packing ring 13 is captured with a metallic locking ring 16 which is preferably continuous and non-expansible. An annular recess 17 is provided for locking ring 16. Both locking ring 16 and packing ring 13 can be simultaneously slipped over flange 18, formed of the metallic material of ring 4 to extend into recess 15. Packing ring 13 has a groove which is shaped to exactly accommodate the shape of flange 18. Slipping both locking ring and packing ring over flange 18 is a manual technique somewhat similar to slipping an automobile tire over its wheel rim. Thus, ring 13 is securely captured between flange 18 and ring 16 within recess 15 of metallic ring 4 to provide seating surface 12 for valve surface 11.

It is to be next noted that ring 16 is not shaped to completely fill the external recess of ring 13. Ring 16 is made sufficiently broad to come up against the end material of the recess, but a surface 19 remains for the fluid pressure of chamber 2 to act upon in developing a force normal to the plane of surface 12 which will carry surface 12 against valve surface 11.

At the same time surface 19 provides the fluid cushioning force for urging surface 12 upward against the valve seat, complementary surface 19A provides the means of developing a force downward and normal to the plane of surface 12A. Forcing surface 12A downward against its mating surface of recess 15 militates against fluid leakage between these surfaces, up to the juncture of surfaces 10 and 12. Although the fluid cushioning force developed on surface 19 and the fluid sealing force developed on surface 19A are initially considered, it must also be remembered that the fluid pressure force along all other surfaces exposed to the pressure of chamber 2 maintains the entire body 13 in compression, within recess 15, to militate against outward flexure from the force of descending valve 8 in its contact with surface 12. Obviously the fatigue of resilient material, such as rubber, is substantially less when the material is subjected to compression forces as opposed to flexing forces.

In addition to Figs. 2, 3 and 4 illustrating the sequential contact between valve surface 11, packing ring surface 12 and metallic ring surface 10, their scale is sufficiently large to illustrate that the angle of inclination, with respect to the horizontal, of surface 12 is slightly greater than that of surface 11. Further, it is clear that surface 12 is a pre-determined distance above the plane of surface 10 in order to positively engage surface 11 with its fluid cushioning force well in advance of the engagement of the metallic surfaces.

It might also be well to note that all edges of body 13 are not as sharp as they might appear in the drawings. Ordinary manufacturing techniques would not enable the supporting surfaces of the recess of ring 4 to be perfectly matched with the mating surfaces of body 13 on a mass production basis. Therefore, a slight rounding of the edges of the surfaces of body 13 aids in making the required matching fit with recess 15.

Fig. 5 also serves to illustrate another embodiment of flange 18 in recess 15 of metallic ring 4. Essentially, flange 18 is triangular and is formed by raising the horizontal wall of recess 15 from each of its ends until they meet at a point in the horizontal plane through the center of body 13. This form of flange is preferred as it causes the supported surfaces of body 13 to closely hug those of the flange.

The cross-section of flange 20 is illustrated as an apicad. Apicad is a word used to designate a form derived from passing two planes through a sphere, parallel to each other and equal distances from the sphere center. With this center cut removed from the sphere, the remaining portions are joined to form the apicad. This selected form of flange was found to effectively capture body 13, with continuous locking band 16.

Fig. 5 also illustrates a modification in the shape of recess 15 which has definite utility. When it is considered that the sand held in suspension within the mud handled by slush pumps is often forced between resilient packings and metallic surfaces, it is desirable to guard against this condition when employing the present invention. Therefore, a slightly rounded chamfer of surface 10, at 21, may be desirable. It has been determined that provision of this receptacle for sand captured at this point by descending surface 11 will obviate its capture between body 13 and the wall of recess 15. The sand is captured loosely in this receptacle, formed by chamfer 21, and is easily washed away by the fluid when valve element 8 is lifted from its seat. The arrangement guards against an accumulation of sand between these two surfaces with the corresponding threat to the seal between them.

In placing the seal ring in place, approximately one-half of it is slipped down into the recess into final position. The remaining half is positioned above the locking flange so that the ring is cocked with about half in position. Locking ring 16 is then slipped downwardly in position and the assembly pushed down until all of the ring is in place.

Although the invention has been disclosed as embodied in the valves of slush pumps, it is to be understood as being equally applicable to the valves of piston-type pumps generally, such as water pumps, cementing pumps, acidizing pumps, etc.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve for controlling flow of fluid to and from a pump cylinder which comprises a metallic seat ring; a valve element mounted for reciprocation toward and away from one end of the ring to control flow therethrough; said ring having an outer peripheral groove therein with the remaining portion of said ring end forming an abutting surface for the valve element; a flange formed of the vertical wall of the groove and extending radially outwardly therefrom into the groove; a reversible annular seat-seal ring supported in the groove with a symmetrical cross-section providing, upper and lower surfaces converging inwardly toward the center of the seat-seal ring, the outer periphery of the upper surface being positioned to contact the valve element prior to the latter contacting the seat ring abutting surface to thereby form an initial fluid energized seal therewith, a vertical surface on the inside of the seat-seal ring having a peripheral groove registering with the outwardly extending flange of the metallic ring groove, upper and lower surfaces converging outwardly away from the center of the seat-seal ring and forming upper and lower symmetrical lip portions, lip surfaces above and below the outwardly converging upper and lower surfaces against which fluid pressure acts to urge the converging inwardly upper and lower surfaces toward the valve element and the lower supporting groove of the metallic ring respectively, and a rigid metallic band capturing the seat-seal ring against the flange of the metallic seat ring from between the lip surfaces, said band being of a width to extend substantially the entire distance between said lip portions and overlying both the upper and lower sides of the flange.

2. A valve seat structure including a seat ring of metallic material with its upper seating surface limited by an outer annular recess which is shaped to accommodate an annular packing ring of resilient material, an annular capturing flange extending outwardly into the recess, a locking band of metallic material arranged about the seat ring and aligned with the annular recess to capture a symmetrical packing ring in the recess on the flange, and a packing ring of resilient material captured between the seat ring recess flange and locking ring and having lip portions at its upper and lower outer peripheries, the band extending so that its upper and lower edges are proximate said lip portions and so that it overlies both the upper and lower surfaces of said flange.

3. The seat of claim 2, in which, the locking ring is supported in an external annular recess formed in the packing ring, and the packing ring has an upper valving surface arranged to extend a pre-determined distance above the plane of the seating surface of the seat ring and with an angle from the horizontal larger than that angle to the seat ring surface plane.

4. A valve for controlling flow of fluid to and from a pump cylinder which comprises a metallic seat ring; a valve element mounted for reciprocation toward and away from one end of the ring to control flow therethrough; said ring having an outer peripheral groove therein with the remaining portion of said ring end forming an abutting surface for the valve element; said groove having an upwardly extending wall providing a flange extending radially outwardly therefrom into the groove; a reversible annular seat-seal ring supported in the groove with a symmetrical cross-section providing, upper and lower surfaces converging inwardly toward the center of the seat-seal ring, the outer periphery of the upper surface being positioned to contact the valve element prior to the latter contacting the seat ring abutting surface to thereby form an initial fluid energized seal therewith, an inner peripheral surface connecting between the inner edges of the upper and lower surfaces and providing a peripheral groove registering with the outwardly extending flange of the metallic ring groove, said ring having an outer annular groove in its outer peripheral surface, the upper and lower ends of said outer groove flaring outwardly so that the ring is provided with upper and lower outwardly extending lip portions and with surfaces at the ends of the groove against which fluid pressure can act to urge the upper and lower lip portion respectively toward the valve element and toward the lower end of the seat ring groove, and a metal band in the outer groove of a width to extend substantially the entire distance between said lip portions and overlying both upper and lower sides of the inner groove and flange.

References Cited in the file of this patent

UNITED STATES PATENTS

| | | |
|---|---|---|
| 125,371 | Windhausen | Apr. 2, 1872 |
| 1,607,943 | Carson | Nov. 23, 1926 |
| 1,914,737 | Elms | June 30, 1933 |
| 1,947,071 | Walton | Feb. 13, 1934 |
| 1,948,628 | Penick | Feb. 27, 1934 |
| 2,148,850 | Deakins | Feb. 28, 1939 |
| 2,673,570 | Cunningham | Mar. 30, 1954 |

Disclaimer 2,969,951.—*George W. Walton*, Dallas, Tex. PUMP VALVE. Patent dated Jan. 31, 1961. Disclaimer filed Mar. 22, 1976, by the assignee, *Dresser Industries, Inc.*

Hereby enters this disclaimer to claims 1–4 of said patent.

[*Official Gazette June 1, 1976.*]